(12) United States Patent
Saito et al.

(10) Patent No.: US 6,612,222 B2
(45) Date of Patent: Sep. 2, 2003

(54) HYDROSTATIC CONTINUOUSLY VARIABLE TRANSMISSION

(75) Inventors: Mitsuru Saito, Saitama (JP); Yoshihiro Yoshida, Saitama (JP); Kazuhiro Takeuchi, Saitama (JP); Yasushi Fujimoto, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 142 days.

(21) Appl. No.: 09/867,608

(22) Filed: May 31, 2001

(65) Prior Publication Data

US 2002/0007632 A1 Jan. 24, 2002

(30) Foreign Application Priority Data

May 31, 2000 (JP) .......................... 2000-162574

(51) Int. Cl.$^7$ .......................... F01B 29/00; F02F 39/14
(52) U.S. Cl. .......................... 92/71; 92/128; 29/888.02; 29/281.5
(58) Field of Search .................. 92/71, 128; 29/888.02, 29/281.5

(56) References Cited

U.S. PATENT DOCUMENTS 3,495,543 A * 2/1970 Millard ..................... 92/128
4,197,627 A * 4/1980 Hirabayashi et al. ...... 29/281.5

FOREIGN PATENT DOCUMENTS

| JP | (B2) 756340 | * | 4/1990 | |
| JP | 03175159 A | * | 7/1991 | F04B/21/00 |
| JP | 03175160 A | * | 7/1991 | F04B/21/00 |
| JP | (A) 4-203553 | * | 7/1992 | |

* cited by examiner

Primary Examiner—Edward K. Look
Assistant Examiner—Igor Kershteyn
(74) Attorney, Agent, or Firm—Birch, Stewart, Kolasch & Birch, LLP

(57) ABSTRACT

A pump swash plate is assembled in a swash plate hydraulic pump in a hydrostatic continuously variable transmission. In a hydrostatic continuously variable transmission having a hydraulic closed circuit constituted between a swash plate hydraulic pump P and a swash plate hydraulic motor M and including a high pressure oil passage for sending hydraulic oil to the hydraulic motor M side from the hydraulic pump P side and a low pressure oil passage for sending hydraulic oil to the hydraulic pump P side from the hydraulic motor M side, a cutaway portion with which an engaging part of a positioning jig fitted in a casing is put into contact when assembling the pump swash plate is provided on the back surface of the plate of the hydraulic pump P.

11 Claims, 4 Drawing Sheets

HYDROSTATIC CONTINUOUSLY VARIABLE TRANSMISSION

BACKGROUND OF THE INVENTION

1. Field of the Invention

The present invention relates to a hydrostatic continuously variable transmission which is assembled with improved workability.

2. Description of Background Art

A hydrostatic continuously variable transmission has been known as a continuously variable transmission for a motorcycle or an automobile. Such a continuously variable transmission is disclosed in Japanese Examined Patent Publication No. 7-56340 and Japanese Unexamined Patent Publication No. 4-203553. Its schematic configuration is illustrated in FIG. 4.

As shown in FIG. 4, this hydrostatic continuously variable transmission has a fixed displacement type swash plate hydraulic pump P connected to the crank shaft side of an engine and a variable displacement type swash plate hydraulic motor M connected to a driving wheel side. The hydraulic pump P and the hydraulic motor M are connected to each other to constitute a hydraulic closed circuit via an inside oil passage (low pressure passage) 52 which is a low pressure passage in a normal load operation but is a high pressure passage in a speed reducing operation, that is, in a reverse load operation and an outside oil passage (high pressure passage) 53 which is a high pressure passage in a normal load operation but is a low pressure passage in a reverse load operation. An oil supply passage 47, connected to an oil supply pump 88 sucking oil from an oil reservoir 87, is connected to the inside oil passage 52 via a first check valve 95 and is connected to the outside oil passage 53 via the second check valve 96.

A pressure regulating valve 97 is disposed between the outside oil passage 53 and the inside oil passage 52. When the hydraulic pressure in the outside oil passage 53, which is a high pressure side in a normal load operation, that is, in an acceleration operation, becomes larger than a predetermined value, the pressure regulating valve 97 introduces part of the hydraulic oil in the outside oil passage 53 into the inside oil passage 52 to prevent the hydraulic pressure in the outside oil passage 53 from becoming excessive.

In a hydrostatic continuously variable transmission having the configuration described above, the fixed displacement type swash plate hydraulic pump P has a plate mounted at a predetermined angle with respect to a pump swash plate (input shaft) and many pump plungers (pistons) each of which is slidably fitted in each of many cylinder bores formed in a cylinder block integral with the output shaft and is engaged with the plate at its outside end. The outside end of the pump plunger is engaged with the plate by putting the spherical portion of the outside end of the each pump plunger into contact with the dimple formed on the plate.

On the other hand, in the cylinder block, a valve bore is formed in each cylinder bore in the radial direction and a distributor valve is mounted in the valve bore such that it can move in the radial direction. The cylinder bore is switched between the inside oil passage and the outside oil passage by the reciprocating motion of the distributor valve in the radial direction. The head portion of the distributor valve is driven by a ring like eccentric cam mounted on the pump plate to move the distributor valve. Accordingly, in order for the hydraulic pump to correctly suck and discharge hydraulic oil, it is necessary to correctly mount the pump swash plate on a casing.

Conventionally, the plate is aligned with the pump plunger by the manual work by an operator as follows: the dimple formed on the plate is put into contact with the spherical portion at the top end of the pump plunger by the tactile sense of the operator while rotating the pump swash plate.

However, since the alignment of the plate with the plunger pump is performed by the tactile sense of the operator, the dimple of the plate is sometimes not aligned with the pump plunger. In particular, when an unskilled operator assembles this transmission in a short cycle of time on a mass production line, it takes much time to assemble the transmission because he does not put the pump plunger in the dimple of the plate but puts the pump plunger on the outside the dimple of the plate or the like. This becomes a cause of increased costs.

SUMMARY AND OBJECTS OF THE INVENTION

The configuration of the present invention for solving the above problem includes a hydrostatic continuously variable transmission having a hydraulic closed circuit constituted between a fixed displacement type swash plate hydraulic pump and a variable displacement type swash plate hydraulic motor, an engaging part to be engaged with a positioning jig when the pump swash plate of the hydraulic pump is mounted in a cylinder block integral with an output shaft is provided on the back surface of the plate of the hydraulic pump and the pump swash plate.

According to the hydrostatic continuously variable transmission having the above configuration, since the engaging part to be engaged with a positioning jig when the pump swash plate of the hydraulic pump is mounted in the cylinder block integral with the output shaft is provided on the back surface of the plate of the hydraulic pump and the pump swash plate, when the pump swash plate is mounted, it can be easily positioned and mounted by putting the positioning jig into contact with the back surface of the plate and the pump swash plate.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more filly understood from the detailed description given hereinbelow and the accompanying drawings which are given by way of illustration only, and thus are not limitative of the present invention, and wherein.

DETAILED DESCRIPTION OF THE PREFERRED EMBODIMENTS

First, the structure of a hydrostatic continuously variable transmission in accordance with one preferred embodiment in which the present invention is applied to the power unit of a vehicle will be described based on FIG. 1 which is a longitudinal cross-sectional view of the hydrostatic continuously variable transmission.

Figure 1:
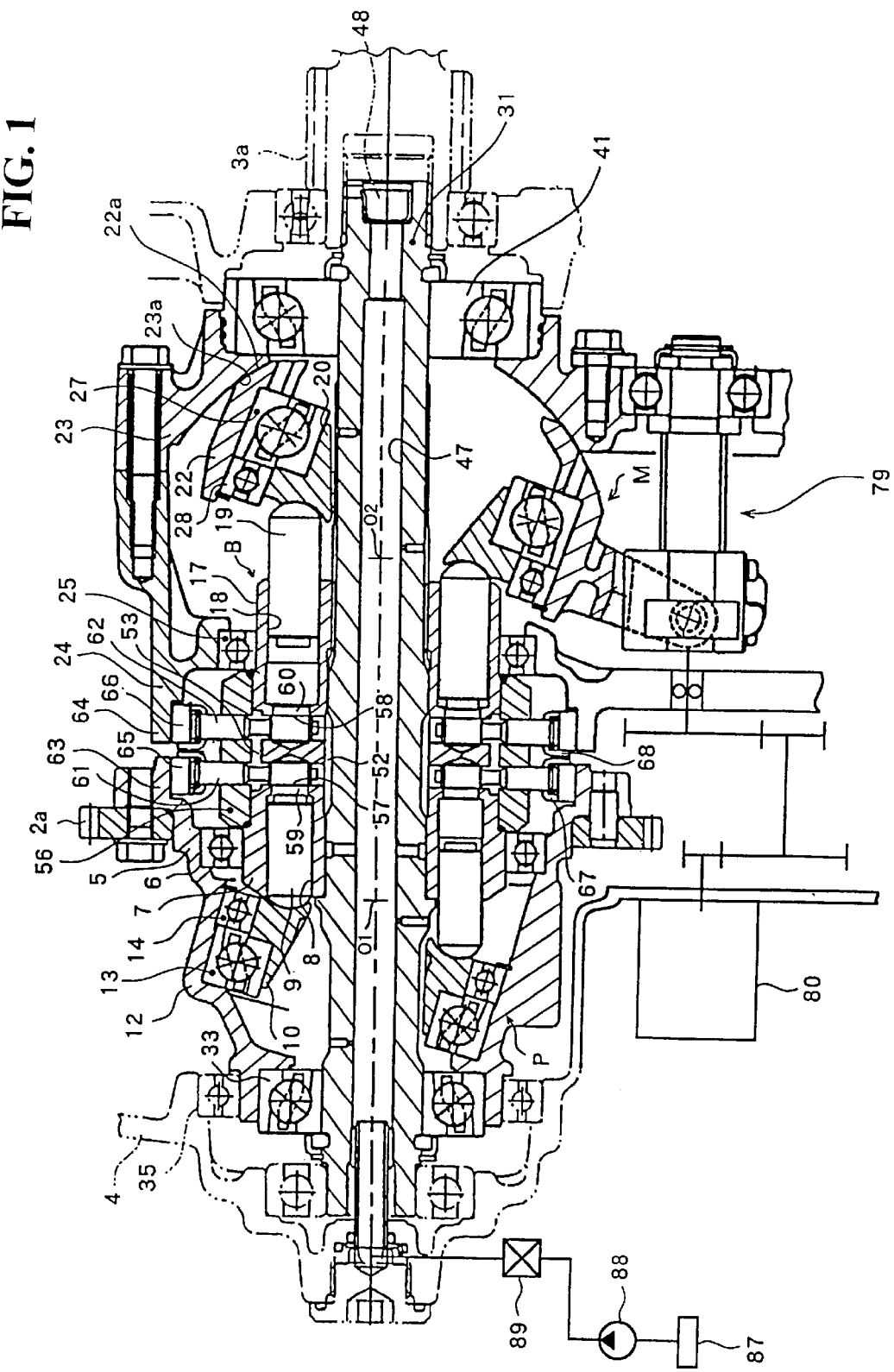
FIG. 1 is a schematic configurational view of a hydrostatic continuously variable transmission in accordance with the present invention.

As illustrated in FIG. 1, a swash plate hydraulic pump P includes an input cylindrical shaft 5 provided with an output gear 2a of a first speed reduction gear; a pump cylinder 7 relatively rotatably supported by the inside peripheral wall of the input cylindrical shaft 5 via a ball bearing 6; a plurality of cylinder bores 8 made in the pump cylinder 7 in an annular arrangement such that they surround the rotary axis of the pump cylinder 7; a plurality of pump plungers 9 slidably fitted in the respective cylinder bores 8; a plate 10 whose front surface is engaged with and put into contact with the outside ends of the respective pump plungers 9; and a pump swash plate 12 for supporting the plate 10 via an angular contact bearing 13 and a radial bearing 14 so as to hold the plate 10 in a state tilted at a predetermined angle with respect to the axis of the pump cylinder 7 around an imaginary trunnion axis O1 intersecting the axis of the pump cylinder 7 at right angles. The pump swash plate 12 is integrally formed with the input cylindrical shaft 5. When the input cylindrical shaft 5 is rotated, the pump swash plate 12 described above reciprocates the pump plungers 9 via the plate 10 and the bearings 13, 14 to make them repeat a suction stroke and a discharge stroke.

On the surface of the plate are formed dimples 10a the number of which is equal to that of the pump plunger 9. The outside end of the pump plunger 9 is shaped in a semi-spherical portion 9a which is engaged with the dimple 10a.

The hydraulic motor M includes a motor cylinder 17 integrally formed with the above-mentioned pump cylinder 7 of a cylinder block B and positioned at the right side in FIG. 1 on the same axis as the pump cylinder 7; a plurality of cylinder bores 18 made in the motor cylinder 17 such that they surround the rotary axis of the motor cylinder 17; a plurality of motor plungers 19 slidably fitted in the respective cylinder bores 18; a plate 20 whose front surface is engaged with and put into contact with the outside ends of the respective pump plungers 19; a motor swash plate 22 for supporting the plate 20 via an angular contact bearing 27 and a radial bearing 28; and a motor swash plate anchor 23 for supporting the back surface of the motor swash plate 22.

The opposed contact surfaces 22a and 23a of the motor swash plate 22 and the motor swash plate anchor 23 which are put into contact with each other are formed in a spherical surface having a center at an intersection of the axis of the motor cylinder 17 and a trunnion axis O2. Further, the motor swash plate 22 is supported by the motor swash plate anchor 23 such that it can relatively rotate around the trunnion axis O2.

A cylindrical cylinder holder 24 is connected to the motor cylinder side end of the motor swash plate anchor 23 and a ball bearing 25 is interposed between the cylinder holder 24 and the outer periphery of the motor cylinder 17.

The motor swash plate 22 is moved between a vertical position at right angles and a maximum tilt position tilted at a predetermined angle with respect to the axis of the motor cylinder 17 when the motor swash plate 22 is rotated around the trunnion axis O2 by a ball screw mechanism 79 connected to a motor 80, and when it is tilted, it can reciprocate the motor plungers 19 to make them repeat a suction stroke and a discharge stroke as the motor cylinder 17 is rotated.

The pump cylinder 7 and the motor cylinder 17 are integrally combined with each other to form the cylinder block B which is integrally formed with an output shaft 31.

One side of the output shaft 31 extends beyond the boundary of the cylinder block B and passes through the plate 10 and the pump swash plate 12 to support the end portion of the pump swash plate 12 via the angular contact ball bearing 33. Further, a ball bearing 35 is disposed between the pump swash plate 12 and the casing 4.

The other side of the output shaft 31 extends beyond the boundary of the cylinder block B and passes through the plate 20, the motor swash plate 22, and the motor swash plate anchor 23. The motor swash plate anchor 23 is supported by the output shaft 31 at an end side of the output shaft 31 (at the right end side in FIG. 1) via an angular contact ball bearing 41. The motor swash plate anchor 23 is integrally formed with the casing 4. An input gear 3a of a second speed reduction gear is mounted on the outer periphery of the output shaft 31 at the distal end in the axial direction of the output shaft 31.

The inside of the hollow output shaft 31 that is integral with the cylinder block B forms an oil supply passage 47. The oil supply passage 47 is connected to an oil reservoir 87 at one end of the output shaft 31 (at the left end side in FIG. 1) via an oil filter 89 and an oil supply pump 88. At the other end of the output shaft 31, the oil supply passage 47 is closed with a plug 48 or is opened with a restricter.

An annular groove is formed on the outer peripheral surface of the output shaft 31 between the group of cylinder bores 8 of the pump cylinder 7 and the group of cylinder bores 18 of the motor cylinder 17 to form an annular inside oil passage 52 between the outer peripheral surface of the output shaft 31 and the inner peripheral surface of the cylinder block B integrally fitted on the output shaft 31. Further, an annular groove is formed on the outer peripheral surface of the cylinder block B to form an annular outside oil passage 53 between the outer peripheral surface of the cylinder block B and the inner peripheral surface of a ring body 56 integrally fitted on the outer peripheral surface of the cylinder block B.

First valve bores 57 are radially made in the annular partition wall between the inside oil passage 52 and the outside oil passage 53 of the cylinder block B, at the group of the cylinder bores 8 side, between the group of cylinder bores 8 of the pump cylinder 7 and the group of cylinder bores 18 of the motor cylinder 17 and in the outer peripheral wall of the outside oil passage 53, that is, in the ring body 56, wherein the number of the first valve bores are equal to that of the cylinder bores 8. Also, second valve bores 58 are radially formed in the annular partition wall between the inside oil passage 52 and the outside oil passage 53 of the cylinder block B, at the group of the cylinder bores 18 side, between the group of cylinder bores 8 of the pump cylinder 7 and the group of cylinder bores 18 of the motor cylinder 17 and in the outer peripheral wall of the outside oil passage 53, that is, in the ring body 56, wherein the number of the second valve bores are equal to that of the cylinder bores 18. The respective cylinder bores 8 communicate with the respective first valve bores 57 through respective pump ports 59 and the respective cylinder bores 18 communicate with the respective second valve bores 58 through respective motor ports 60.

Spool type first distributor valves 61 are slidably fitted in the respective first valve bores 57 and spool type second distributor valves 62 are slidably fitted in the second valve bores 58. Then, a first eccentric ring (eccentric cam) 63 surrounding the first distributor valves 61 is engaged with the outside ends of the first distributor valves 61 via a slip ring (or a ball bearing) 65 and a second eccentric ring (eccentric cam) 64 surrounding the second distributor valves 62 is engaged with the outside ends of the second distributor valves 62 via a slip ring (or a ball bearing) 66.

The outside ends of the first distributor valves 61 are combined with each other by a first expansion ring 67 concentric with the first eccentric ring 63 and the outside ends of the second distributor valves 62 are combined with each other by a second expansion ring 68 concentric with the second eccentric ring 64.

The first eccentric ring 63 is integrally formed with the input cylindrical shaft 5 and is positioned eccentrically by a predetermined distance 1 from the center of the cylinder block B along the tilt center (imaginary trunnion axis O1) of the pump swash plate 12. Also, the second eccentric ring 64 is connected to the cylinder holder 24 and is positioned eccentrically by a predetermined distance 2 from the center of the cylinder block B along the tilt center (imaginary trunnion axis O2) of the motor swash plate 20.

Here, describing the action of the first distributor valve 61, when a relative rotation is produced between the input cylindrical shaft 5 and the pump cylinder 7, that is, the cylinder block B, the respective first distributor valves 61 are reciprocated by the first eccentric ring 63 between the inside positions and the outside positions in the radial direction of the pump cylinder 7 with a stroke of two times the amount of eccentricity $\epsilon 1$ in the first valve bore 57. In the discharge region of the hydraulic pump P, the first distributor valve 61 is moved to the inside position to make the corresponding pump port 59 communicate with the outside oil passage 53 and to shut the communication between the pump port 59 and the inside oil passage 52, whereby the hydraulic oil is pressure-fed to the outside oil passage 53 from the cylinder bore 8 by the pump plunger 9 in a discharge stroke.

Also, in the suction region of the hydraulic pump P, the first distributor valve 61 is moved to the outside position side to make the corresponding pump port 59 communicate with the inside oil passage 52 and to shut the communication between the pump port 59 and the outside oil passage 53, whereby the hydraulic oil is sucked into the cylinder bore 8 from the inside oil passage 52 by the pump plunger 9 in a suction stroke.

Here, describing the action of the second distributor valve 62, when the motor cylinder 17, that is, the cylinder block B is rotated, the respective second distributor valves 62 are reciprocated by the second eccentric ring 64 between the inside positions and the outside positions in the radial direction of the cylinder block B with a stroke of two times the amount of eccentricity $\epsilon 2$ in the second valve bore 58. In the expansion region of the hydraulic motor M, the second distributor valve 62 is moved to the inside position to make the corresponding motor port 60 communicate with the outside oil passage 53 and to shut the communication between the motor port 60 and the inside oil passage 52, whereby the high pressure hydraulic oil is supplied to the cylinder bore 18 of the motor plunger 19 in an expansion stroke from the outside oil passage 53.

Also, in the contraction region of the hydraulic motor M, the second distributor valve 62 is moved to the outside position side to make the corresponding motor port 60 communicate with the inside oil passage 52 and to shut the communication between the motor port 60 and the outside oil passage 53, whereby the hydraulic oil is discharged into the inside oil passage 52 from the cylinder bore 18 of the motor plunger 19 in a contraction stroke.

In this way, the cylinder block B is rotated by the sum of a reactive torque which is applied to the pump cylinder 7 by the pump swash plate 12 via the pump plunger 9 in the discharge stroke and a reactive torque which is applied to the motor cylinder 17 by the motor swash plate 22 via the motor plunger 19 in the expansion stroke and the rotational torque is transmitted to the second speed reduction gear by the output shaft 31. In this case, the speed change ratio of the output shaft 31 to the input cylindrical shaft 5 is given by the following equation, Speed change ratio=1+(displacement of hydraulic motor M/displacement of hydraulic pump P)

Therefore, if the displacement of the hydraulic motor M is changed to a certain value from zero, the speed change ratio can be changed from 1 to a certain necessary value. Further, since the displacement of the hydraulic motor M is determined by the stroke of the motor plunger 19, the speed change ratio can variably be controlled from 1 to a certain value by tilting the motor swash plate 22 from a vertical position to a certain tilt position.

Figure 2:
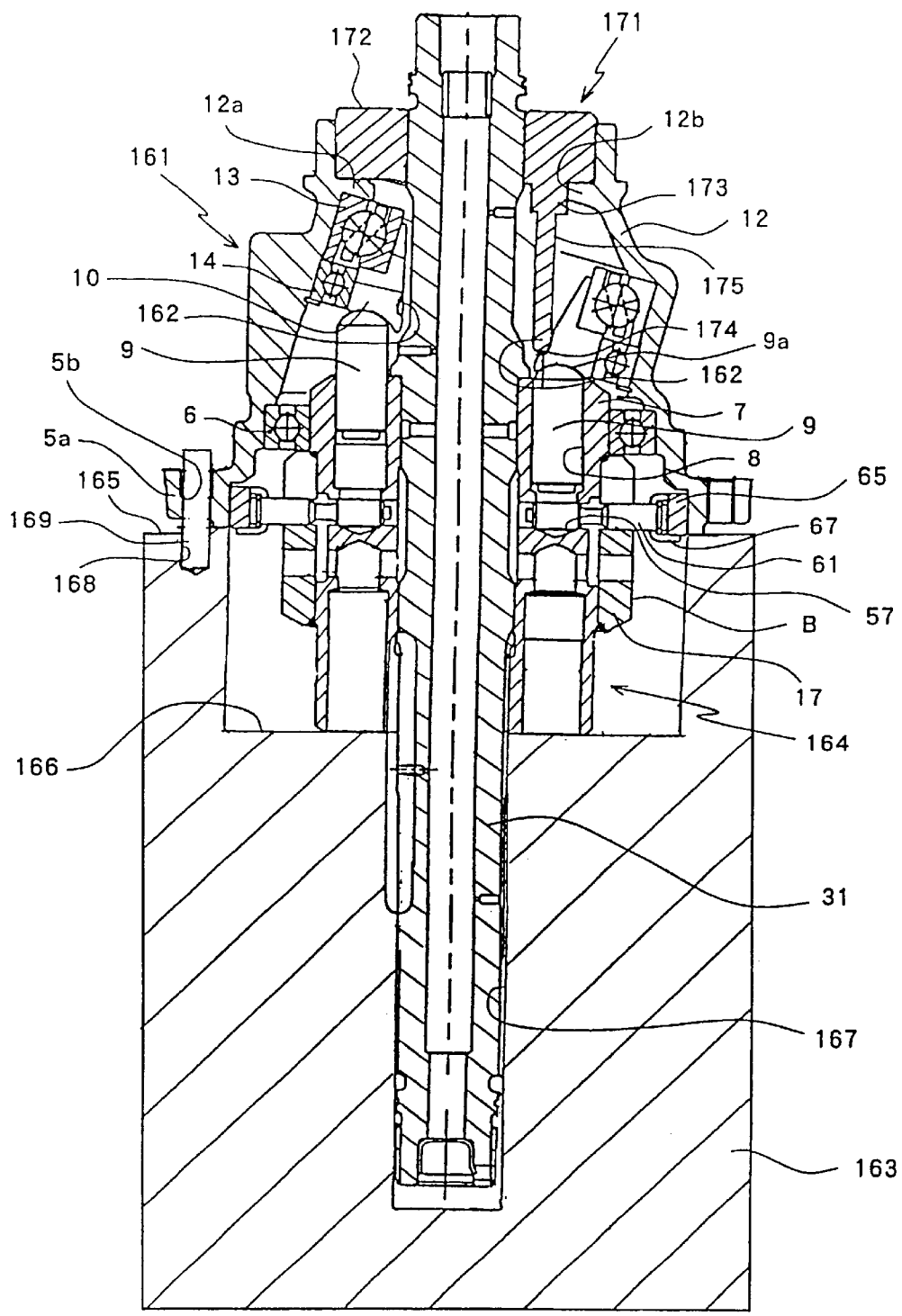
FIG. 2 is a cross-sectional view to show a working state in which a hydrostatic continuously variable transmission is assembled.
Figure 3A:
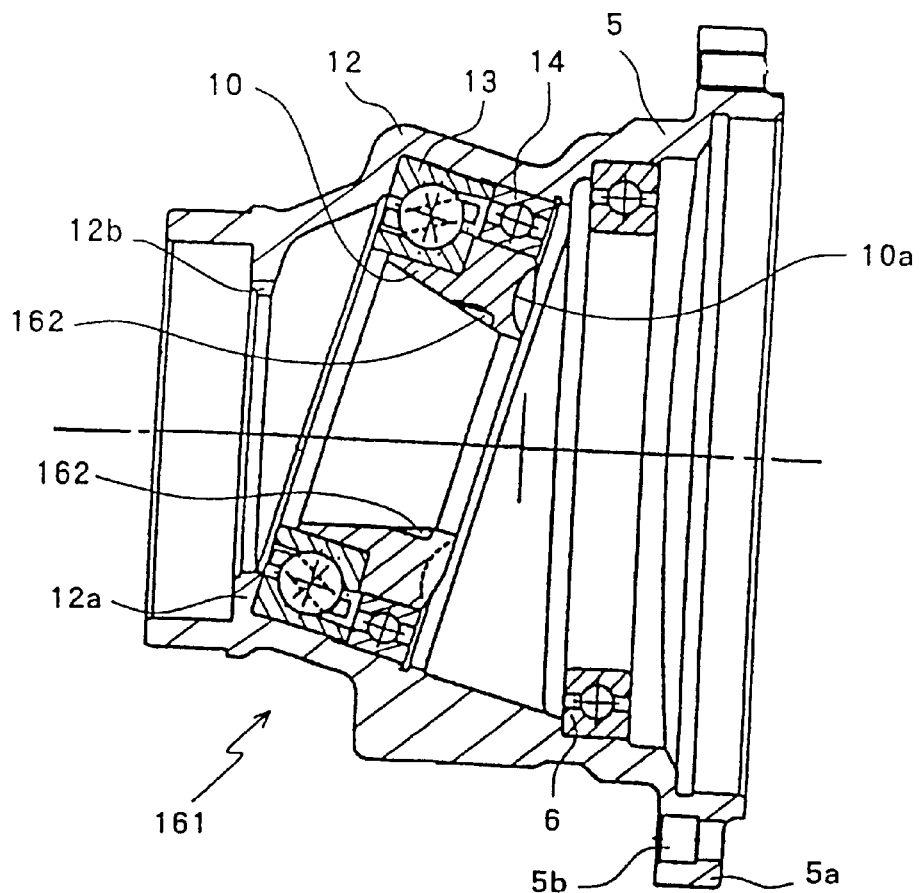
FIG. 3(a) is a cross-sectional view of a pump swash plate assembly.
Figure 3B:
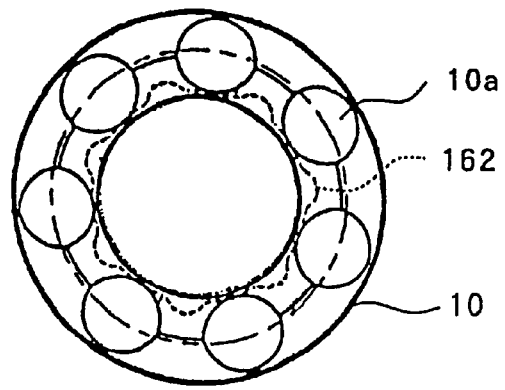
FIG. 3(b) is a front view of a pump swash plate.
Figure 4:
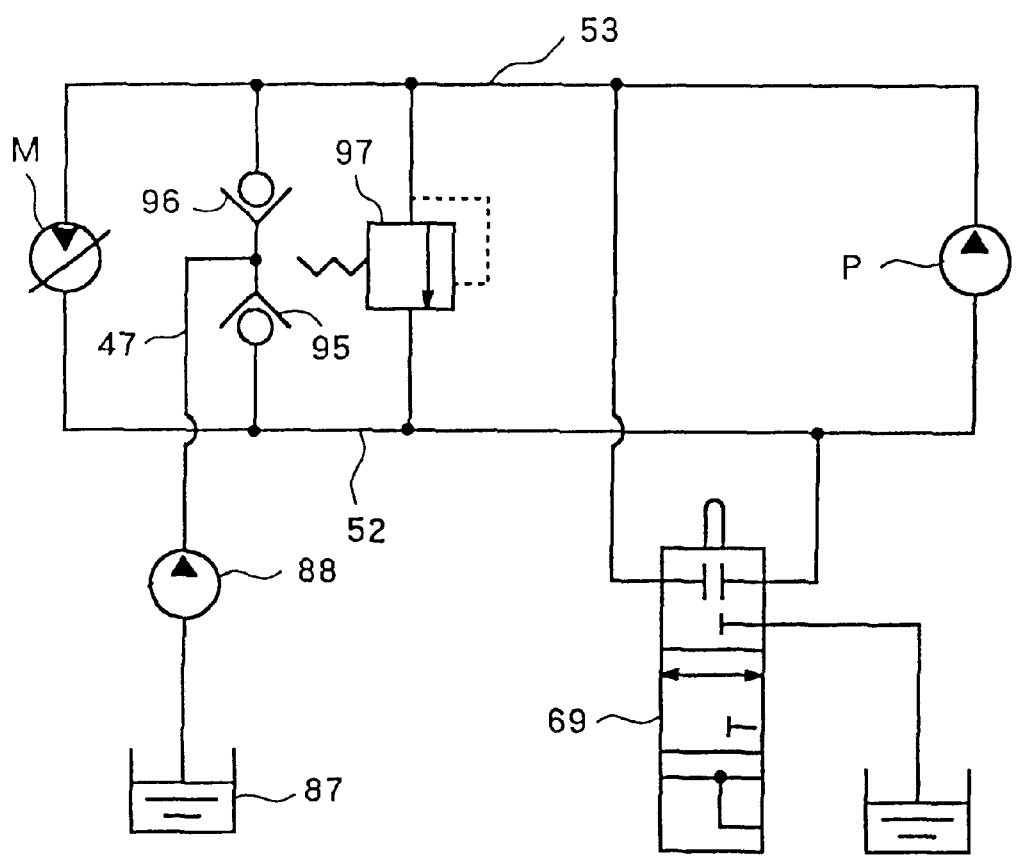
FIG. 4 is a schematic configurational view of a hydrostatic continuously variable transmission.

In FIG. 2, there is shown one step of assembling a hydrostatic continuously variable transmission. FIG. 3(*a*) shows a cross-sectional view of a pump swash plate assembly and FIG. 3(*b*) shows a front view of a plate 10.

As shown in FIG. 3(*a*), in a pump swash plate assembly 161, the plate 10 is supported at a predetermined angle with respect to the center axis by an angular contact bearing 13 and the radial bearing 14 in the input cylindrical shaft 5) (a portion corresponding to the pump swash plate 12) constituting the casing of the hydraulic pump P. On the surface of the plate 10 are formed a predetermined number of dimples 10*a*(here, seven dimples) with which the spherical portion 9*a* of the end portion of the pump plunger 9 is engaged. On the back surface of the plate 10 are formed cutaway portions 162 shown in FIG. 3(*b*). In the input cylindrical shaft 5 is also fitted the ball bearing 6 for rotatably supporting the pump cylinder 7 of the cylinder block B. Here, a cutaway portion 12*b* is formed as an engaging portion for positioning a positioning jig described below in the flange portion 12*a* of the pump swash plate 12 of the input cylindrical shaft 5. Bolt holes 5*b* are provided in the flange portion 5*a* at the end of the input cylindrical shaft 5 for mounting the output gear 2*a* of the first speed reduction gear, the bolt hole 5*b* serving as a nock hole for positioning the gear.

As shown in FIG. 2, an assembly 164 of the output shaft 31 and the cylinder block B is mounted in a jig base 163. The output shaft 31/cylinder block B assembly 164 is made by mounting pump plungers 9 in the cylinder bores 8 of the pump cylinders 7 of the cylinder block B integral with the output shaft 31 and further mounting the first distributor valves 61 in the first valve bores 57. The first distributor valves 61 are combined to each other by a first expansion ring 67 and are provided with a slip ring 65 at the outside thereof.

The top surface of the jig base 163 forms a base surface 165 having a depressed portion and the bottom surface thereof is a receiving surface 166 for receiving the cylinder block B. In the receiving surface 166 is formed a positioning hole 167 for introducing and positioning the output shaft 31. Also, a pin hole 168 for positioning the pump swash plate assembly 161 is made in the base surface 165.

The output shaft 31 is inserted into the positioning hole 167 of the jig base 163 to receive the end surface of motor cylinder 17 side of the cylinder block B by the receiving surface 166, whereby the end surface of the input cylindrical shaft 5 is placed on the base surface 165. The output shaft 31/cylinder block B assembly 164 is positioned with respect to the jig base 163 by the use of a portion 32 made by burying the groove of a spline made on the output shaft 31.

The pump swash plate assembly 161 is inserted from above the output shaft 31/cylinder block B assembly 164 and the inside of the end portion of the input cylindrical shaft 5 is fitted in a slip ring 65 and the bearing 6 is fitted in the cylinder 7, whereby the end surface of the pump swash plate assembly 161 is placed on the base surface 165 of the jig base 163. The nock hole 5*b* of the flange portion 5*a* of the input cylindrical shaft 5 is aligned with the pin hole 168 of the base surface 165 and a positioning pin 169 is inserted into the pin hole 168 to position the pump swash plate assembly 161.

A positioning jig 171 is fitted in the end portion of the pump swash plate 12 side of the input cylindrical shaft 5 of the pump swash plate assembly 161. The positioning jig 171 includes a base portion 172 shaped like a ring, a base matching portion 173 projecting from the base portion 172 and fitted in the cutaway portion 12b made in the flange portion 12a of the pump swash plate 12, and a positioning shaft 175 extending from the base matching portion 173 and having a spherical positioning portion 174 at the top end and a predetermined length.

The spherical positioning portion 174 at the top end of the positioning shaft 175 of the positioning jig 171 is fitted in the cutaway portion (groove) 162 made on the back surface of the plate 10 to position the pump plunger 9 with respect to the dimple 10a. That is, the cylinder block/output shaft assembly 164 is positioned with respect to the jig base 163, and the pump swash plate assembly 161 is positioned with respect to the jig base 163, and the positioning jig 171 is positioned with respect to the pump swash plate assembly 161, and the pump plunger 9 is positioned with respect to the cutaway portion 162 corresponding to the dimple 10a by the positioning jig 171. Accordingly, the position of pump plunger 9 is uniquely determined with respect to the dimple 10a and hence the pump plunger 9 is easily correctly aligned with the dimple 10a.

After the above-mentioned aligning and assembling work is finished, the positioning jig 171 is removed from the input cylindrical shaft 5 and a bearing 33 for supporting the input cylindrical shaft 5 with respect to the output shaft 31 is fitted in the input cylindrical shaft 5. Then, the pump swash plate assembly 161 is removed from the jig base 163 and a hydraulic motor M side assembly and parts are mounted therein.

Here, the positioning jig 171, and the cutaway portion 162 are not necessarily formed in the shapes described above but may be formed in various shapes.

According to the hydrostatic continuously variable transmission in accordance with the present invention, in a hydrostatic continuously variable transmission having a hydraulic closed circuit constituted between a fixed displacement type swash plate hydraulic pump and a variable displacement type swash plate hydraulic motor, an engaging part to be engaged with a positioning jig when the pump swash plate of the hydraulic pump is mounted in a casing is provided on the back surface of the plate of the hydraulic pump and the pump swash plate. Accordingly, the position of the dimple of the plate is uniquely determined with respect to the plunger pump and hence even an unskilled operator can simply correctly mount the pump swash plate to shorten assembling cycle time, which results in a cost reduction.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A positioning jig for a hydrostatic continuously variable transmission having a hydraulic closed circuit constituted between a fixed displacement swash plate hydraulic pump and a variable displacement swash plate hydraulic motor, comprising:
   an engaging part of a pump swash plate of the hydraulic pump for engaging with said positioning jig when the pump swash plate of the hydraulic pump is assembled in a casing, said engaging part being provided on a back surface of the pump swash plate.

2. The positioning jig for a hydrostatic continuously variable transmission according to claim 1, wherein the engaging part has cutaway portion formed on the back surface of the pump swash plate for permitting alignment of dimples on a surface of the pump plate with pump plungers.

3. The positioning jig for a hydrostatic continuously variable transmission according to claim 1, wherein said positioning jig includes a base portion for engaging an output shaft and a positioning shaft extending from said base portion for positioning the engaging part in a predetermination orientation for aligning dimples on a surface of the pump plate with pump plungers.

4. The positioning jig for a hydrostatic continuously variable transmission according to claim 3, wherein said positioning shaft includes a spherical positioning portion for positioning the engaging part in a predetermined position.

5. The positioning jig for a hydrostatic continuously variable transmission according to claim 1, and further including a jig base for holding the hydrostatic continuously variable transmission as the positioning jig engages the engaging part.

6. The positioning jig for a hydrostatic continuously variable transmission according to claim 5, and further including a nock hole in a flange portion of an input shaft for alignign a pump swash plate assembly relative to the jig base.

7. A positioning jig for a hydrostatic continuously variable transmission having a hydraulic closed circuit constituted between a fixed displacement swash plate hydraulic pump and a variable displacement swash plate hydraulic motor, comprising:
   a jig base for receiving the hydrostatic continuously variable transmission;
   a pump plate including a plurality of dimples for mounting pump plungers relative thereto;
   said pump plate including first cutaway portions formed on a rear surface thereof for aligning the dimples on the plate relative to the pump plungers,
   said positioning jig for alignment with second cutaway portions for aligning the dimples on the pump plate relative to the pump plungers when the pump plate of the hydraulic pump is assembled in a casing.

8. The positioning jig for a hydrostatic continuously variable transmission according to claim 7, wherein the second cutaway portions are recesses formed on a back surface of the pump swash plate for permitting alignment of dimples on a surface of the pump plate with the pump plungers.

9. The positioning jig for a hydrostatic continuously variable transmission according to claim 7, wherein said positioning jig includes a base portion which engages an output shaft and positioning shaft extending from said base portion for positioning the first cutaway portions in a predetermination orientation for aligning dimples on a surface of the pump plate with the pump plungers.

10. The positioning jig for hydrostatic continuously variable transmission according to claim 9, wherein said positioning shaft includes a spherical positioning portion for positioning the first cutaway portions in a predetermined position.

11. The positioning jig for a hydrostatic continuously variable transmission according to claim 7, and further including a nock hole in a flange portion of an input shaft for aligning a pump swash plate assembly relative to the jig base.

* * * * *